(12) United States Patent
Park et al.

(10) Patent No.: US 9,084,135 B2
(45) Date of Patent: Jul. 14, 2015

(54) METHOD AND APPARATUS FOR RECEIVING DATA AT MOBILE STATION IN SLEEP MODE IN WIRELESS COMMUNICATION SYSTEM

(75) Inventors: Giwon Park, Anyang-si (KR); Kiseon Ryu, Anyang-si (KR); Youngsoo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 13/824,134

(22) PCT Filed: Sep. 8, 2011

(86) PCT No.: PCT/KR2011/006666
§ 371 (c)(1),
(2), (4) Date: May 20, 2013

(87) PCT Pub. No.: WO2012/036418
PCT Pub. Date: Mar. 22, 2012

(65) Prior Publication Data
US 2013/0235776 A1    Sep. 12, 2013

Related U.S. Application Data

(60) Provisional application No. 61/383,333, filed on Sep. 16, 2010, provisional application No. 61/393,933, filed on Oct. 17, 2010, provisional application No. 61/405,173, filed on Oct. 20, 2010, provisional application No. 61/406,170, filed on Oct. 25, 2010, provisional application No. 61/409,966, filed on Nov. 4, 2010.

(51) Int. Cl.
*H04W 52/02* (2009.01)
*H04W 28/02* (2009.01)

(52) U.S. Cl.
CPC ...... *H04W 28/0221* (2013.01); *H04W 52/0216* (2013.01); *H04W 52/0229* (2013.01)

(58) Field of Classification Search
None
See application file for complete search history.

(56) References Cited

U.S. PATENT DOCUMENTS

| 2010/0254293 A1* | 10/2010 | Son et al. | 370/311 |
| 2011/0053657 A1* | 3/2011 | Jl | 455/574 |
| 2012/0106416 A1* | 5/2012 | Zheng et al. | 370/311 |

FOREIGN PATENT DOCUMENTS

| CN | 1592439 A | 3/2005 |
| CN | 1941967 A | 4/2007 |

(Continued)

OTHER PUBLICATIONS

LAN/MAN Standars Committee, IEEE Computer Society, IEEE Microwave Theory and Techniquues Society: "Part 16: air interface for fixed and mobile broadband wireless access systems," IEEE Wirelessman 802.16, Feb. 2010, XP0027212696.

(Continued)

*Primary Examiner* — Mohammad Adhami
(74) *Attorney, Agent, or Firm* — McKenna Long & Aldridge LLP

(57) ABSTRACT

A method and apparatus for receiving data at a mobile station in a wireless communication system are disclosed. A method of receiving data mobile station in a wireless communication system includes receiving an Advanced Air Interface Traffic Indication (AAI_TRF-IND) message including a positive indicator during a listening window from a base station, and receiving a traffic by extending the listening window without restriction as to an extension range of the listening window from the BS if there is traffic to be transmitted to or received from the base station after the listening window.

13 Claims, 13 Drawing Sheets

(56) References Cited

FOREIGN PATENT DOCUMENTS

| CN | 101040550 A | 9/2007 |
|---|---|---|
| CN | 101147337 A | 3/2008 |
| EP | 1511335 A2 | 3/2005 |

OTHER PUBLICATIONS

LAN/MAN Standards Committee of the IEEE computer society and the IEEE microwave theory and technique society, DRAFT Amendment to IEEE Standard for Local and metropolitan area networks, "Part 16: Air Interface for Broadband Wireless Access Systems", IEEE P802.16m/D7, Jul. 29, 2010.

IEEE 802.16 Broadband wireless access working group, IEEE C802.16m-10/0577r2, 20100430, Vladimir Yanover, et al., Cleanup of sleep mode section.

Giwon Park, et al., "Proposed text on traffic indication operation (D4-16.2-16)" IEEE 802.16 Broadband Wireless Access Working Group, IEEE C802.16m-10/0121, 2010.0.03-05.

Minxin Xu, et al., "Efficient Error Handling for Lost AAI_TRF-IND Message in Sleep Mode (16.2.17)", IEEE 802.16 Broadband Wireless Access Working Group, IEEE C802.16m-10/1248r1, Sep. 10, 2010.

Yeongmoon Son, et al., "Modification on the error handling for lost AAI_TRF-IND message (section 16.2.17.2.3.1)", IEEE 802.16 Broadband Wireless Access Working Group, IEEE C802.16m-10/0854, Jul. 9, 2010.

Yeongmoon Son, et al., "Modification on the range of Initial Sleep/Listening Window (section 16.2.3.24)", IEEE 802.16 Broadband Wireless Access Working Group IEEE C802.16m-10/0855, Jul. 9, 2010.

Nan Li, et al., "Text clean up for sleep operation in IEEE 802.16m (P802.16m/D6-16.2.17)", IEEE C802.16m-10/0902r1, Jul. 13, 2010.

Yeongmoon Son, et al., "Cleanup for Sleep Cycle Setting in AAI-DSx-REQ/RSP", IEEE 802.16 Broadband Wireless Access Working Group, IEEE C802.16m-10/1226, Sep. 8, 2010.

\* cited by examiner

METHOD AND APPARATUS FOR RECEIVING DATA AT MOBILE STATION IN SLEEP MODE IN WIRELESS COMMUNICATION SYSTEM

This Application is a 35 U.S.C. §371 National Stage Entry of International Application No. PCT/KR2011/006666, filed Sep. 8, 2011 and claims the benefit of U.S. Provisional Application Nos. 61/383,333, filed Sep. 16, 2010; 61/393,933, filed Oct. 17, 2010 ; 61/405,173, filed Oct. 20, 2010; 61/406,170, filed Oct. 25, 2010; and 61/409,966, filed Nov. 4, 2010 all of which are incorporated by reference in their entirety herein.

TECHNICAL FIELD

The present invention relates to a wireless communication system, and more particularly, to a method and apparatus for receiving data at a mobile station in a sleep mode in a wireless communication system.

BACKGROUND ART

First, a sleep mode operation will be described. While a Mobile Station (MS) communicates with a Base Station (BS) in normal or active mode, if traffic to be transmitted to or received from the BS is not present, the MS transmits an Advanced Air Interface Sleep Request (AAI_SLP-REQ) message to the BS to request transition to a sleep mode. The BS transmits an Advanced Air Interface Sleep Response (AAI_SLP-RSP) message to the MS as a response to the AAO_SLP-REQ message. Upon receiving the AAI_SLP-RSP message, the MS transits to the sleep mode by applying a sleep parameter included in the AAI_SLP-RSP message. The sleep parameter includes a sleep cycle, a listening window, and the like. Alternatively, the BS may cause the MS to transit to the sleep mode by directly transmitting an unsolicited AAI_SLP-RSP message to the MS.

FIG. 1 illustrates operation of an MS in sleep mode in an IEEE 802.16m system. As illustrated in FIG. 1, after transiting to sleep mode from normal mode, an MS operates in sleep mode by applying an initial sleep cycle. As shown, a first sleep cycle includes only a sleep window. Sleep cycles including a second sleep cycle after the first sleep cycle include a listening window and a sleep window. Upon receiving an Advanced Air Interface Traffic Indication (AAI_TRF-IND) message including a negative indication during a listening window of an n-th sleep cycle, the MS determines that there is no traffic transmitted to a downlink and sets the n-th sleep cycle to double an (n−1)-th sleep cycle. Upon receiving an AAI_TRF-IND message including a positive indication during a listening window of an (n+1)-th sleep cycle, the MS sets the (n+1)-th sleep cycle to an initial sleep cycle.

FIG. 2 illustrates a process of receiving an AAI_TRF-IND message at an MS. A BS transmits an AAI_TRF-IND message at least once to a sleep mode MS during a listening window. In the prior art, if the BS transmits an AAI_TRF-IND message including a positive indication, the BS determines, without receiving a response from the MS, that the MS sets a sleep cycle to an initial sleep cycle the moment the BS transmits the AAI_TRF-IND message. However, if the MS does not receive the AAI_TRF-IND message including a positive indication transmitted by the BS, the MS waits for the AAI_TRF-IND message during a listening window. In this case, sleep cycle synchronization between the MS and the BS fails. Accordingly, as illustrated in FIG. 2, if the MS does not receive the AAI_TRF-IND message during a listening window, the MS transmits an AAI_TRF_IND-REQ message to the BS. Upon receiving the AAI_TRF_IND-REQ message, the BS transmits an AAI_TRF_IND-RSP message including a positive or negative indication to the MS. The AAI_TRF-IND message includes a frame number in which the AAI_TRF-IND message is most recently transmitted. Upon receiving the AAI_TRF_IND-RSP message, the MS checks the frame number and a traffic indication to establish broken sleep cycle synchronization between the MS and the BS. FIG. 2 shows the case where the BS transmits a positive indication as a response to the AAI_TRF_IND-REQ message.

In the prior art, upon receiving the AAI_TRF-IND message including a positive indication from the BS, the sleep mode MS sets a sleep cycle to an initial sleep cycle. If there is traffic to be received from the BS even after a listening window, the MS may continue to receive traffic transmitted by the BS by implicitly extending the listening window. However, the listening window is extended within a current sleep cycle. FIG. 3 illustrates extension of a listening window at an MS. As illustrated in FIG. 3, if a BS continues to transmit traffic to an MS, since extension of a listening window is limited within a sleep cycle, the BS should transmit an unnecessary AAI_TRF-IND message. That is, in the case where the BS should successively transmit downlink traffic, a process in which the BS unnecessarily transmits the AAI_TRF-IND message to the MS and the MS sets a sleep cycle to an initial sleep cycle is repeated.

When transmitting the AAI_TRF-IND message to MSs operating in sleep mode, the BS broadcasts one AAI_TRF-IND message to all sleep mode MSs, listening windows of which are overlapped. However, when receiving an AAI_TRF-IND message including a positive indication, sleep mode MSs set a sleep cycle based on a value of a Next Sleep Cycle Flag (NSCF) included in an SLP-REQ message and an SLP-RSP message. When receiving an AAI_TRF-IND message including a negative indication, sleep mode MSs set a sleep cycle to double a previous sleep cycle. If a plurality of sleep mode MSs repeat these processes several times, listening windows of sleep mode MSs may not be overlapped. Accordingly, since the BS should frequently transmit the AAI_TRF-IND message, overhead may be encountered.

In the prior art, when an MS receives the AAI_TRF-IND message including a positive indication, it is not defined when a sleep cycle is set. Namely, it is not defined whether to set a start point of a sleep cycle to a start point of a listening window during which an AAI_TRF-IND message including a positive indication has been received or to a start point of a next sleep cycle of a listening window during which an AAI_TRF-IND message including a positive indication has been received.

As described above, according to the prior art, overhead in that a BS should frequently transmit an AAI_TRF-IND message may occur.

DISCLOSURE OF INVENTION

Technical Problem

An object of the present invention devised to solve the above problem lies in providing a data reception method of a sleep mode MS to reduce overhead.

The technical problems to be solved by the present invention are not limited to the above-mentioned technical problem, and other technical problems not mentioned above can be clearly understood by one skilled in the art from the following description.

Solution to Problem

The object of the present invention can be achieved by providing method receiving data at a mobile station (MS) in a wireless communication system, including receiving an Advanced Air Interface Traffic Indication (AAI_TRF-IND) message including a positive indication during a listening window from a Base Station (BS), and receiving a traffic by extending the listening window without restriction as to an extension range of the listening window from the BS if there is traffic to be transmitted to or received from the BS after the listening window.

The method may further include receiving a last traffic during the extended listening window, ending extension of the listening window and starting a new sleep cycle, and resetting a sleep cycle according to a value of a next sleep cycle flag (NSCF) if a traffic indication message including a positive indicator during a listening window of the new sleep cycle, resetting a sleep cycle according to a value of a next sleep cycle flag (NSCF), wherein the NSCF indicates a setting method of a sleep cycle when the MS receives a positive indicator.

The NSCF may be determined through negotiation with the BS when the MS enters sleep mode.

The method may further include receiving a last traffic during the extended listening window, and receiving a sleep control header (SCH) including a start frame number and a new initial sleep cycle, wherein the start frame number indicates a start point of a next sleep cycle, and the new initial sleep cycle indicates a length of the next sleep cycle.

The method may further include setting a sleep cycle to the new initial sleep cycle in the start frame number. The MS recognizes specific traffic as last traffic when the MS does not receive next traffic before a predetermined timer expires after receiving the specific traffic.

The predetermined timer may be determined through negotiation with the BS when the MS enters sleep mode.

In another aspect of the present invention, provided herein is a method receiving data at a mobile station (MS) in a wireless communication system, including, transmitting an Advanced Air Interface Traffic Indication Request (AAI_TRF-IND-REQ) message to the BS if an Advanced Air Interface Traffic Indication (AAI_TRF-IND) message is not received from a Base Station (BS) during a listening window, and receiving an Advanced Air Interface Traffic Indication Response (AAI_TRF-IND-RSP) message including a frame number (Frame_Number) field from the BS, wherein the frame number field indicates a time point at which a next sleep cycle is started.

The AAI_TRF-IND-RSP message may further include a new initial sleep cycle indicating a length of the next sleep cycle.

The method may further include setting a sleep cycle to a length indicated by the new initial sleep cycle field in a frame indicated by the frame number field.

In a further aspect of the present invention, provided herein is a mobile station (MS) in a wireless communication system, including a receiving module for receiving an Advanced Air Interface Traffic Indication (AAI_TRF-IND) message including a positive indicator during a listening window from a Base Station (BS), and a processor for extending the listening window without restriction as to an extension range of the listening window if there is traffic to be transmitted to or received from the BS after the listening window.

Advantageous Effects of Invention

According to the embodiments of the present invention, since a sleep mode MS receives data by extending a listening window without any restriction as to an extension range of a listening window, overhead in that a BS should frequently transmit an AAI_TRF-IND message can be reduced.

The effects of the present invention are not limited to the above-mentioned effects and other effects not mentioned above can be clearly understood by one skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 5 is a diagram illustrating another example of a process for ending extension of a listening window at an MS;

BEST MODE FOR CARRYING OUT THE INVENTION

Hereinafter, exemplary embodiments of the present invention will be described with reference to the accompanying drawings. The detailed description, which will be disclosed along with the accompanying drawings, is intended to describe the exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details. For example, although the following detailed description is given based upon a 3GPP2 802.16 mobile communication system, aspects of the present invention that are not specific to the 3GPP2 802.16 system are applicable to other mobile communication systems.

In some instances, known structures and/or devices are omitted or are shown in block diagram form focusing on important features of the structures and/or devices, so as not to obscure the concept of the present invention. The same reference numbers will be used throughout this specification to refer to the same or like parts.

In the following description, a 'Mobile Station (MS)' is assumed to refer to a mobile or fixed user end device such as a User Equipment (UE) etc. and a 'Base Station (BS)' is assumed to refer to any node of a network end, such as a Node B, eNode B, etc., communicating with the MS.

First, a data reception method of a sleep mode MS in a wireless communication system according to a first exemplary embodiment of the present invention is described.

In the first exemplary embodiment of the present invention, an extension range of a listening window of an MS is not restricted to a sleep cycle. Namely, if there is data to be transmitted to or received from a BS even after a listening window, the MS receives data by extending a listening window without restriction as to an extension range of the listening window.

Figure 1:
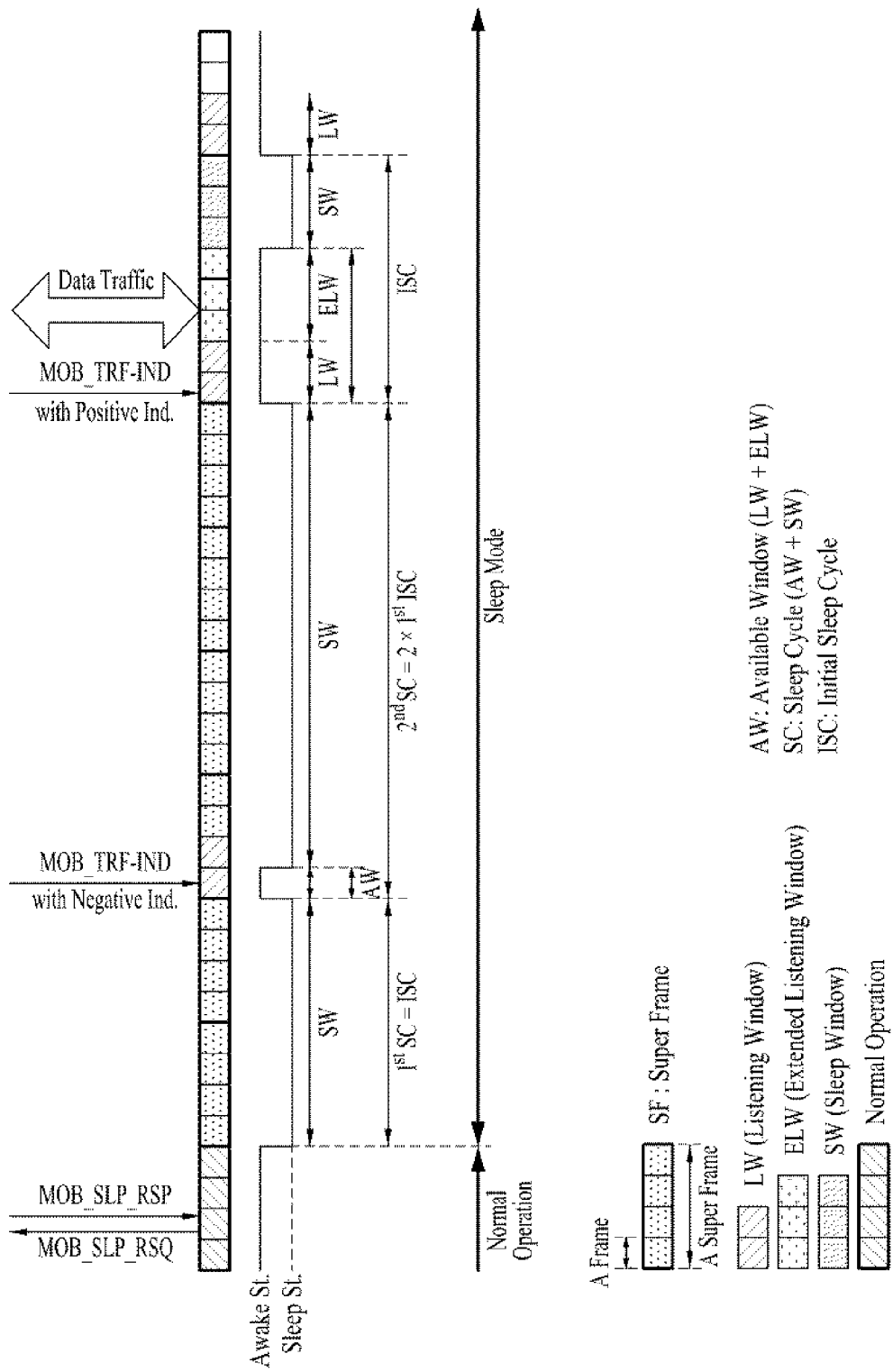
FIG. 1 illustrates operation of a sleep mode MS in an IEEE 802.16m system.
Figure 2:
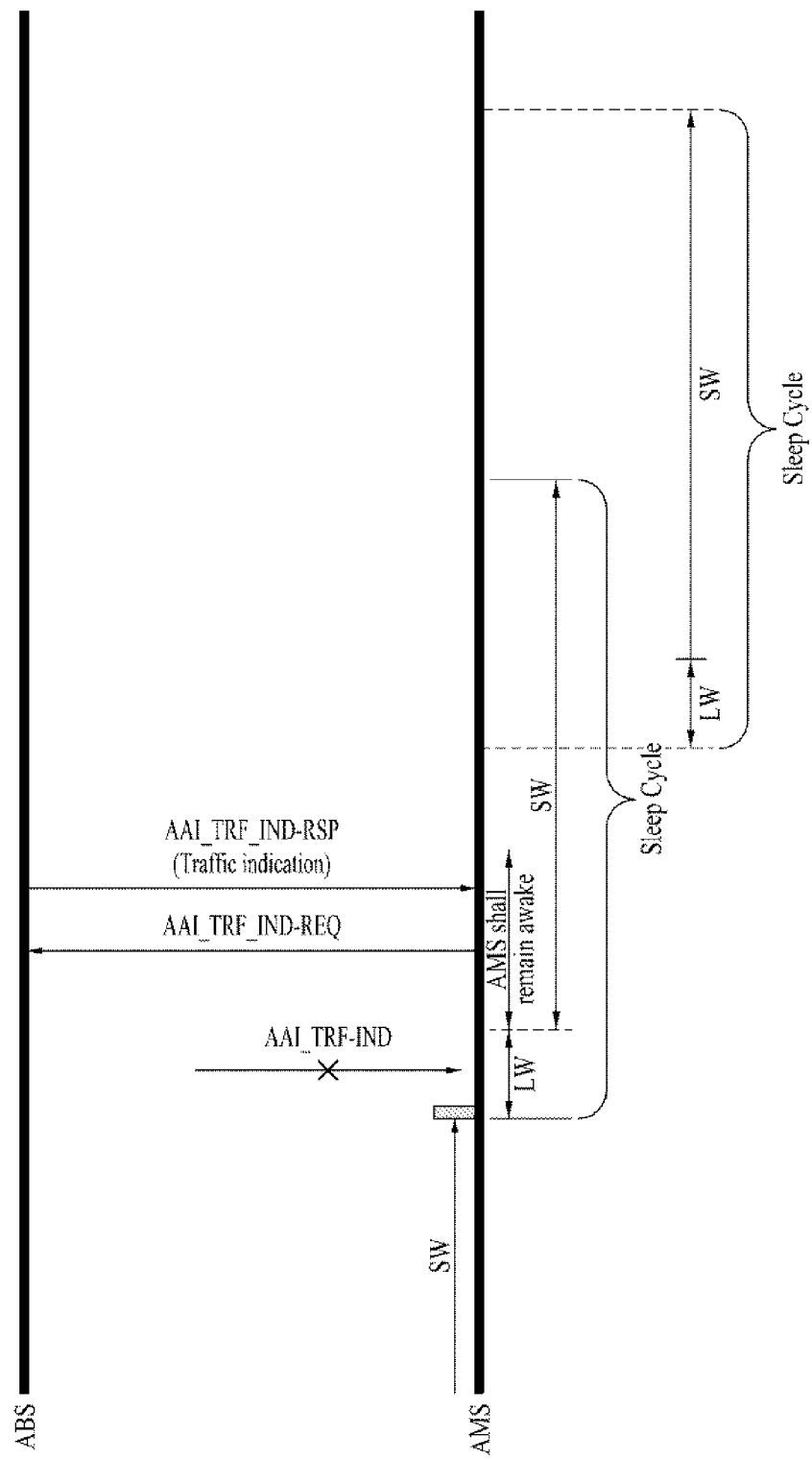
FIG. 2 illustrates a process of receiving an AAI_TRF-IND message at an MS.
Figure 3:
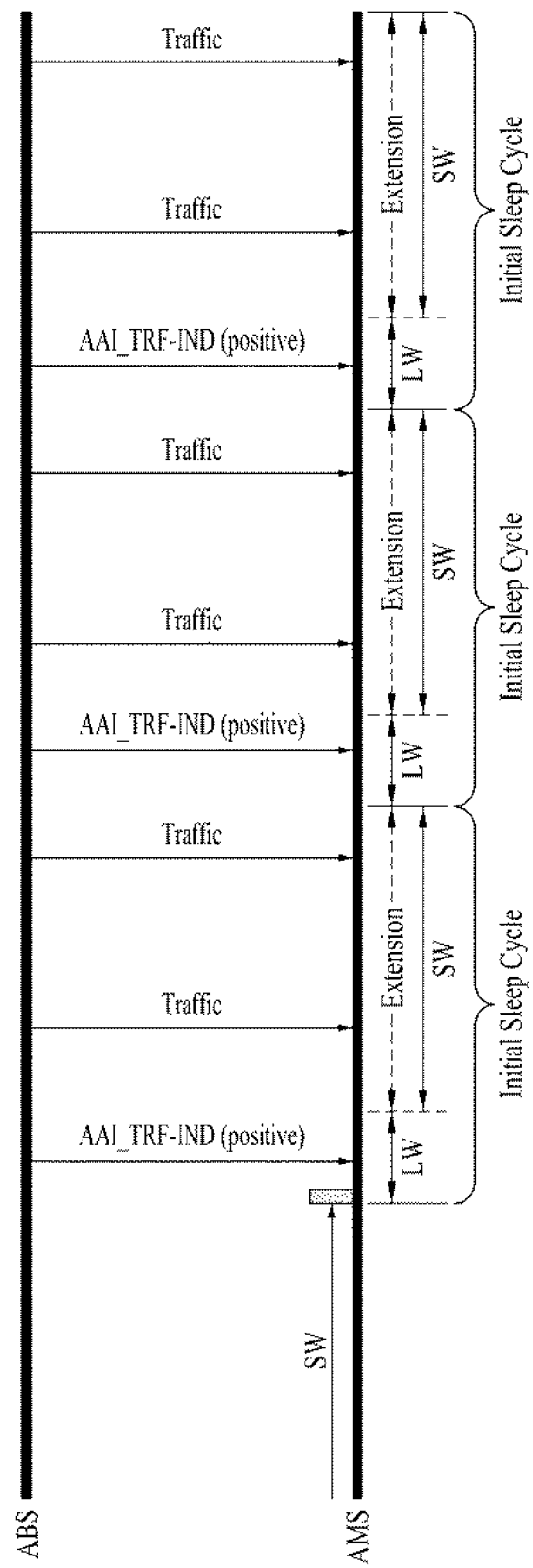
FIG. 3 illustrates extension of a listening window at an MS.
Figure 4:
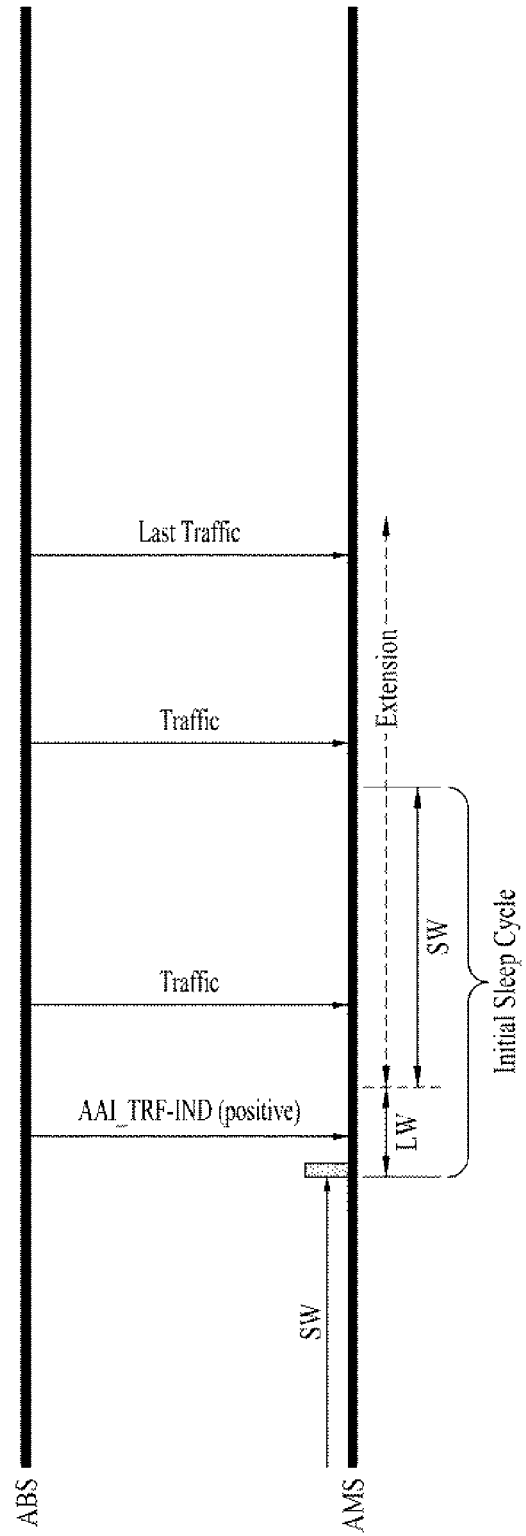
FIG. 4 is a diagram illustrating extension of a listening window of an MS according to a first exemplary embodiment of the present invention.

FIG. 4 is a diagram illustrating extension of a listening window of an MS according to the first exemplary embodiment of the present invention. As illustrated in FIG. 4, the MS receives an Advanced Air Interface Traffic Indication (AAI_TRF-IND) message including a positive indicator during a listening window. The MS receives data from a BS during the listening window. However, there may be cases where the BS does not transmit all data which should be transmitted to the MS within the listening window. That is, data which should be transmitted to the MS may remain even after the listening window. In this case, the MS may receive data from the BS by extending the listening window. The MS can extend the listening window without any restriction as to an extension range of the listening window.

After receiving the last traffic by extending the listening window, the MS should end extension of the listening window and should start a new sleep cycle. Accordingly, in the first exemplary embodiment of the present invention, a method is proposed for determining a time point at which extension of a listening window is ended and a new sleep cycle is started.

Figure 5:
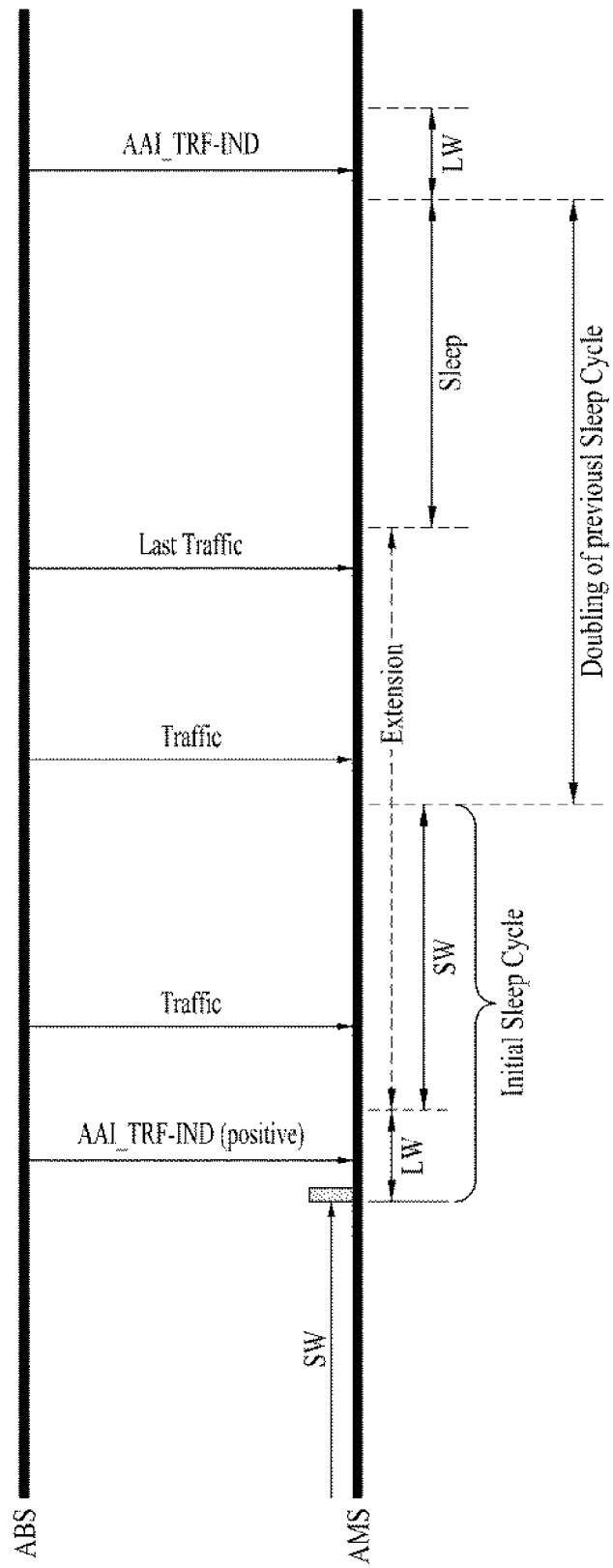
FIG. 5 is a diagram illustrating an example of a process for ending extension of a listening window at an MS.

FIG. 5 is a diagram illustrating an example of a process for ending extension of a listening window at an MS. As illustrated in FIG. 5, if the MS receives the last traffic from a BS and ends extension of a listening window, the MS operates by applying double a previous sleep cycle. In other words, if the MS receives an AAI_TRF-IND message including a positive indicator during a listening window of an n-th sleep cycle and extends the listening window to above the n-th sleep cycle, an (n+1)-th sleep cycle is set to double the n-th sleep cycle. The MS saves power during the remaining sleep cycle after receiving the last traffic within the (n+1)-th sleep cycle, and receives an AAI_TRF-IND message from the BS during a listening window of a next sleep cycle.

Figure 6:
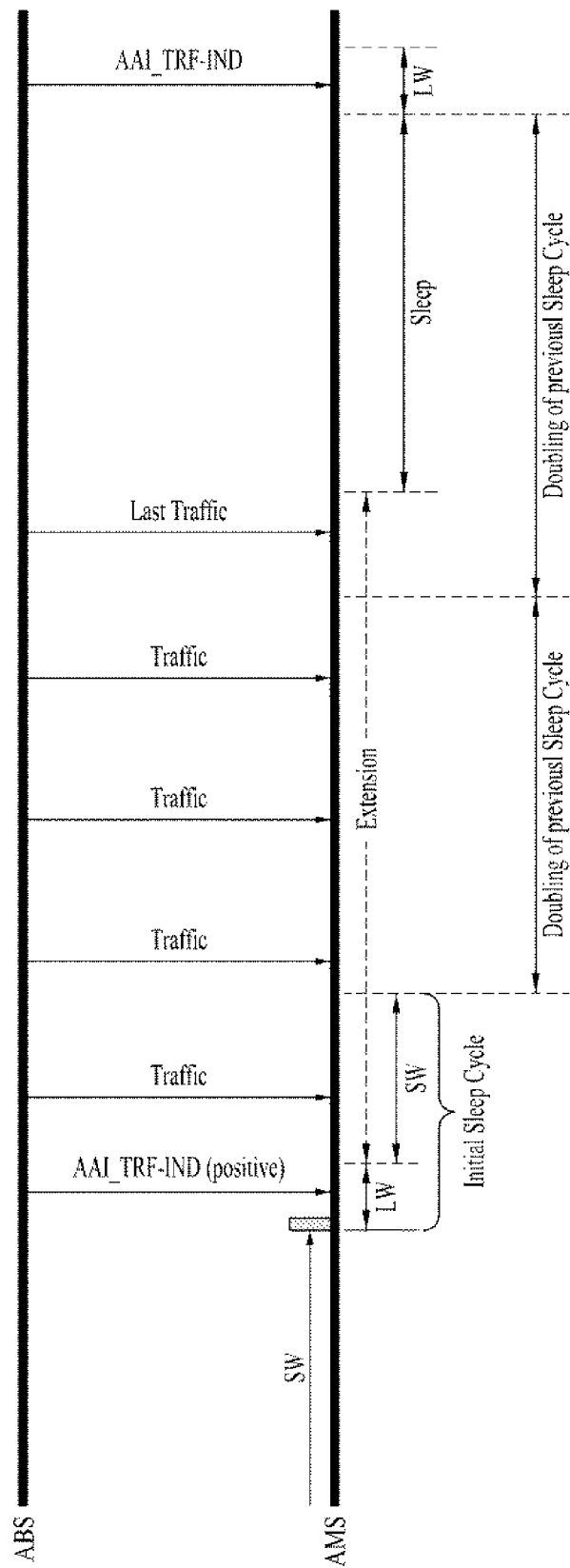

FIG. 6 is a diagram illustrating another example of a process for ending extension of a listening window at an MS.

In FIG. 6, if an MS receives an AAI_TRF-IND message including a positive indicator during a listening window of an n-th sleep cycle and extends the listening window to above the n-th sleep cycle, an (n+1)-th sleep cycle is set to double the n-th sleep cycle. If the MS does not end reception of downlink traffic during the (n+11)-th sleep cycle, an (n+2)-th sleep cycle is set to double the (n+1)-th sleep cycle. Upon receiving the last traffic within the (n+2)-th sleep cycle, the MS saves power during the remaining sleep cycle.

Next, a data reception method of a sleep mode MS in a wireless communication system according to a second exemplary embodiment of the present invention will be described.

When a BS transmits an AAI_TRF-IND message to MSs operating in sleep mode, the BS broadcasts one AAI_TRF-IND message to all sleep mode MSs, listening windows of which are overlapped. However, when receiving an AAI_TRF-IND message including a positive indicator, the sleep mode MSs set a sleep cycle based on a value of a Next Sleep Cycle Flag (NSCF) included in an SLP-REQ message or an SLP-RSP message. If the sleep mode MS receives an AAI_TRF-IND message including a negative indication, the sleep mode MS sets a sleep cycle to double a previous sleep cycle. The value of the NSCF is determined through negotiation with the BS while the MS enters sleep mode. According to the value of the NSCF, the MS sets a sleep cycle to an initial sleep cycle, a new sleep cycle, or double a previous sleep cycle. However, while a plurality of MSs repeat a process of setting a sleep cycle several times, listening windows of the plurality of MSs may not be overlapped. If listening windows of sleep mode MSs are not overlapped, overhead in that the BS should frequently transmit an AAI_TRF-IND message occurs. Further, in the prior art, if the MS receives an AAI_TRF-IND message including a positive indicator, it is not defined at which time point a sleep cycle is set.

Accordingly, when a sleep mode MS receives a positive indicator, a start point of a listening window during which the positive indicator has been received may be designated as a start point of a sleep cycle so that start points of listening windows of all sleep mode MSs which have received the positive indicator can be synchronized.

The sleep mode MS receives the positive indicator, and receives traffic by extending a listening window when there is downlink traffic to be received from the BS even after the listening window. If the sleep mode MS receives a positive indicator in a next listening window after the downlink traffic has been received, the sleep mode MS may designate a start point of a listening window during which the positive indicator has been received as a start point of a sleep cycle. Then, start points of listening windows of all sleep mode MSs which have received the positive indicator can be synchronized.

Figure 7:
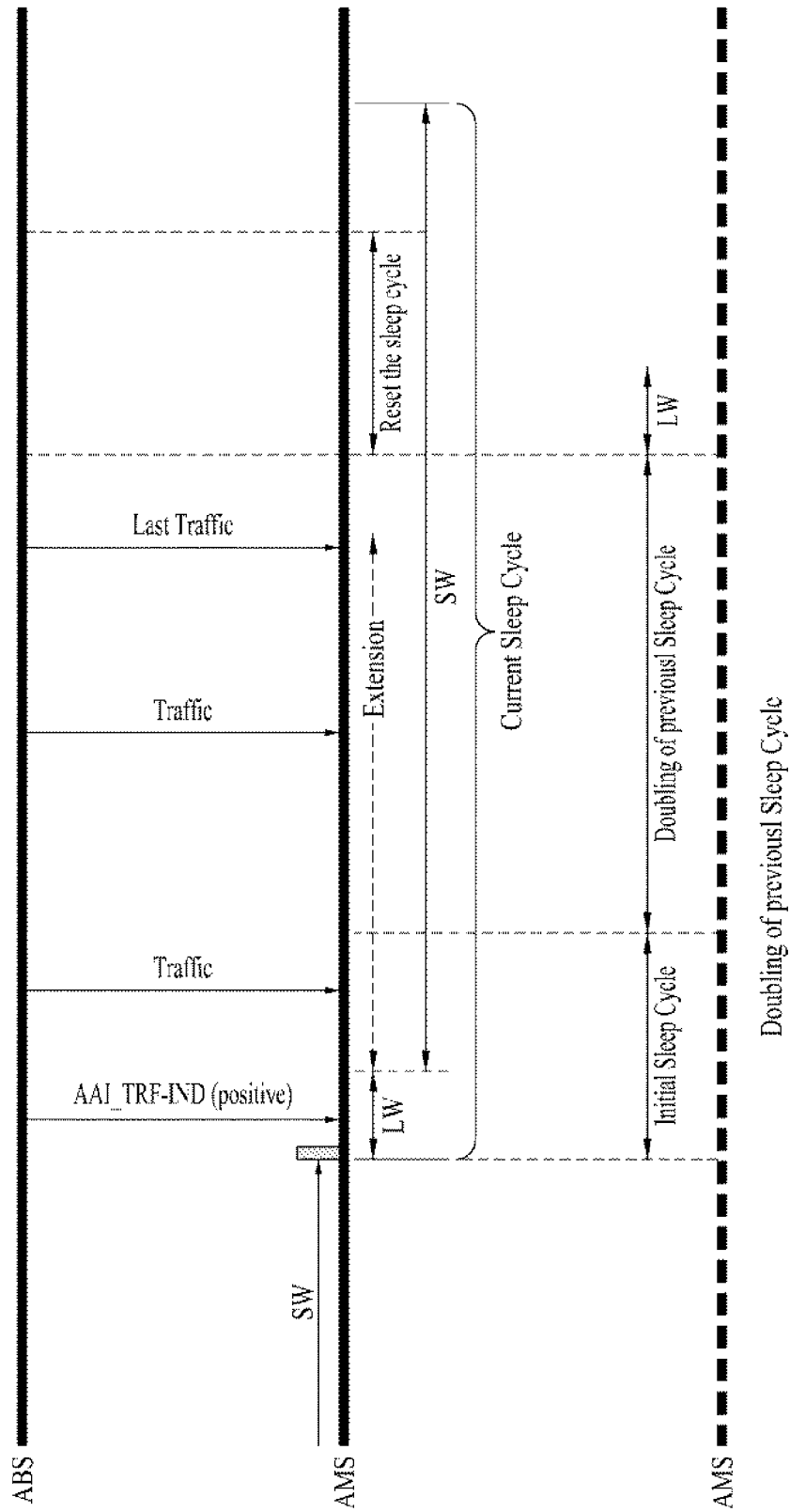
FIG. 7 is a diagram illustrating an example of a method for synchronizing start points of listening windows of sleep mode MSs according to a second exemplary embodiment of the present invention.

FIG. 7 is a diagram illustrating an example of a method for synchronizing start points of listening windows of sleep mode MSs according to the second exemplary embodiment of the present invention.

FIG. 7 shows operation of an MS, in which the MS receives a positive indicator during a listening window thereof, under the state that a sleep cycle is sufficiently lengthened by extending a sleep cycle a few times since there is no data transmitted from a BS, and continues to receive downlink traffic after the listening window. When receiving the last traffic while continuously receiving downlink traffic by extending a listening window, the MS resets a sleep cycle. The MS can recognize the last traffic through T_AMS timer. Namely, if the MS receives no traffic before expiration of the T_AMS timer after receiving specific traffic, the MS recognizes the specific traffic as the last traffic. The T_AMS timer is determined through negotiation with the BS when the MS enters sleep mode.

A method for resetting a sleep cycle after the MS receives the last traffic will now be described. Upon receiving a positive indicator, the MS can calculate a sleep cycle. The MS resets a sleep cycle to an initial sleep cycle and may implicitly calculate a sleep cycle thereof by determining that a next sleep cycle is extended to double the initial sleep cycle. If downlink or uplink traffic transmission is ended, the MS determines a location of a sleep cycle to be reset according to the calculated sleep cycle. As illustrated in FIG. 7, if the MS receives a positive indicator in a listening window of a next sleep cycle of a sleep cycle including a time point at which traffic transmission/reception is ended, the MS resets a sleep cycle according to a value of an NSCF.

Alternatively, the BS may inform MSs of a start frame number of a sleep cycle to synchronize listening windows of sleep mode MSs. The BS may transmit an AAI_TRF-IND or AAI_TRF-IND-RSP message including a start frame number of a sleep cycle. If the MS receives an AAI_TRF-IND or AAI_TRF-IND-RSP message including a positive indicator, the MS resets a sleep cycle based on a value of an NSCF and the start frame number included in the AAI_TRF-IND or AAI_TRF-IND-RSP message. That is, the MS resets a sleep cycle at a start frame corresponding to the start frame number included in the AAI_TRF-IND or AAI_TRF-IND-RSP message.

Alternatively, in order to adjust synchronization of listening windows of sleep mode MSs, the BS may transmit an AAI_TRF-IND, AAI_TRF-IND-RSP or unsolicited AAI_SLP-RSP message, including a new initial sleep cycle and a start frame number, to the MS. The new initial sleep cycle is set in consideration of sleep cycles of MSs operating in a sleep mode in order to adjust synchronization of listening windows of the sleep mode MSs.

Table 1 and Table 2 show an AAI_TRF-IND message according to the second exemplary embodiment of the present invention.

Table 1 shows the case where the AAI_TRF-IND message includes a frame number (Frame_Number) field. Table 2 shows the case where the AAI_TRF-IND message includes the Frame_Number field and a New Initial Sleep Cycle field.

TABLE 1

| Field | Size(bits) | Value/Description | Condition |
| --- | --- | --- | --- |
| AAI-TRF-IND message_format( ) { | | | |
| FRMT | 1 | This indicates type of Traffic Indication in AAI-TRF-IND message.0: It indicates the SLPID bitmap-based traffic indication.1: It indicates the SLPID-based traffic indication. | |
| Emergency Alert Indication | 1 | Used to indicate the presence of emergency information for supporting the emergency alert service.0b0: There is no emergency information.0b1: There is emergency information. | |
| if(FMT == 0) { | | | |
| SLPID Group Indication Bitmap | 32 | It indicates the existence of each SLPID group.N-th bit of SLPID-Group Indication Bitmap [MSB corresponds to N = 0] is allocated to SLPID Group that includes AMS with SLPID values from N*32 to N*32+31.0: There is no traffic for any of the 32 AMSs that belong to the SLPID-Group.1: There is traffic for at least one AMS in SLPID-Group. | |
| Traffic Indication Bitmap | N*32 | It indicates the traffic indication for 32 AMSs in each SLPID group.Each Traffic Indication bitmap comprises multiples of 32-bit long Traffic Indication units. A Traffic Indication unit for 32 SLPIDs is added to AAI-TRF-IND message whenever its SLPID Group is set to 1.32 bits of Traffic Indication Unit (starting from MSB) are allocated to AMS in the ascending order of their SLPID values:0: Negative indication1: Positive indicationN= The number of '1' in SLPID Group Indication Bitmap (i.e. the number of SLPID Group which has positive traffic indication). | |
| Num_positive_indication | | Number of sleep mode AMSs receiving positive indication | |
| for(i=0; i<Num_positive_indication; i++) { | | | |

TABLE 1-continued

| Field | Size(bits) | Value/Description | Condition |
|---|---|---|---|
| Frame_Number | 10 | Time point at which sleep cycle starts (time point at which listening window starts)The least significant 10 bits of the frame number in which incoming sleep cycle will start.0~1023When the AMS receives positive traffic indication from the ABS, it shall reset the Sleep Cycle based on NSCF in AAI_SLP-REQ/RSP message at Start Frame Number in AAI_TRF-IND message. | |
| }<br>} else {<br>Num_of_SLPIDs | 6 | It indicates the number of SLPID included in AAI-TRF-IND message.0~63 | |
| for (i = 0; i < Num_of_SLPIDs; i++) {<br>SLPID | 10 | Each SLPID is used to indicate the positive traffic indication for an AMS.0~1023 | |
| }<br>}<br>} | | | |

TABLE 2

| Field | Size(bits) | Value/Description | Condition |
|---|---|---|---|
| AAI-TRF-IND message_format( ) {<br>FRMT | 1 | This indicates type of Traffic Indication in AAI-TRF-IND message.0: It indicates the SLPID bitmap-based traffic indication.1: It indicates the SLPID-based traffic indication. | |
| Emergency Alert Indication | 1 | Used to indicate the presence of emergency information for supporting the emergency alert service.0b0: There is no emergency information.0b1: There is emergency information. | |
| if(FMT == 0) {<br>SLPID Group Indication Bitmap | 32 | It indicates the existence of each SLPID group.N-th bit of SLPID-Group Indication Bitmap [MSB corresponds to N = 0] is allocated to SLPID Group that includes AMS with SLPID values from N*32 to N*32+31.0: There is no traffic for any of the 32 AMSs that belong to the SLPID-Group.1: There is traffic for at least one AMS in SLPID-Group. | |
| Traffic Indication Bitmap | N*32 | It indicates the traffic indication for 32 AMSs in each SLPID group.Each Traffic Indication bitmap comprises multiples of 32-bit long Traffic Indication units. A Traffic Indication unit for 32 SLPIDs is added to AAI-TRF-IND message whenever its SLPID Group is set to 1.32 bits of Traffic Indication Unit (starting from MSB) are allocated to AMS in the ascending order of their SLPID values:0: Negative indication1: Positive indicationN= The number of '1' in SLPID Group Indication Bitmap (i.e. the | |

TABLE 2-continued

| Field | Size(bits) | Value/Description | Condition |
|---|---|---|---|
| Num_positive_indication | | number of SLPID Group which has positive traffic indication) Number of sleep mode MSs receiving positive indication | |
| for(i=0; i<Num_positive_indication; i++) { | | | |
| Frame_Number | 10 | Time point at which sleep cycle starts (time point at which listening window start).The least significant 10 bits of the frame number in which incoming sleep cycle will start.0~1023When the AMS receives positive traffic indication from the ABS, the AMS shall reset the Sleep Cycle based on the starting frame number and the size of New Initial Sleep Cycle in the AAI-TRF-IND. | |
| New Initial Sleep Cycle | | New initial sleep cycle to be used by AMS receiving positive traffic indication.The length of Sleep Cycle which contains the next scheduled Listening Window. If the AMS receives the positive traffic indication during the Listening Window, the (current) Sleep Cycle shall be set to this value at that time.Value: 0~1023Sleep Cycle Length = Value + 1 | |
| } } else { | | | |
| Num of SLPIDs | 6 | It indicates the number of SLPID included in AAI-TRF-IND message.0~63 | |
| for (i = 0; i < Num_of_SLPIDs; i++) { | | | |
| SLPID | 10 | Each SLPID is used to indicate the positive traffic indication for an AMS.0~1023 | |
| } } } | | | |

The Frame_Number field indicates a time point at which a sleep cycle is started. The Frame_Number field may indicate least significant 10 bits of a frame number in which the sleep cycle is started. Upon receipt of the AAI_TRF-IND message of a form shown in Table 1, the MS sets a sleep cycle according to a value of an NSCF in a frame indicated by the Frame_Number field.

The New Initial Sleep Cycle field indicates a new initial sleep cycle to be used by the MS receiving a positive indicator. Namely, upon receiving the AAI_TRF-IND message of a form shown in Table 2, the MS sets a sleep cycle to a sleep cycle indicated by the New Initial Sleep Cycle field in a frame indicated by the Frame_Number field.

Table 3 shows an unsolicited AAI_SLP-RSP message according to the second exemplary embodiment of the present invention. As shown in Table 3, the unsolicited AAI_SLP-RSP message includes a Start Frame Number field.

TABLE 3

| Field | Size(bits) | Value/Description | Condition |
|---|---|---|---|
| AAI-SLP-RSP message_format( ) { | | | |
| Response_Code | 2 | This indicates response type of AAI-SLP-RSP message.0b00 : Request by ABS in Unsolicited manner0b01 : Approval of AAI-SLP-REQ0b10 : Rejection of AAI-SLP-REQ0b11 : Reserved | |
| if(Response_Code != 0b10) { | | | |
| Operation | 2 | This indicates operation request type of AAI-SLP-RSP message.0b00 : Exit from Sleep | |

TABLE 3-continued

| Field | Size(bits) | Value/Description | Condition |
|---|---|---|---|
| | | Mode0b01 : Enter Sleep Mode0b10 : Change Sleep Cycle setting0b11 : Switch Sleep Cycle setting | |
| if(Operation != 00) { | | | |
| SCID | 4 | Sleep Cycle ID0~15 | |
| FFBCH_Operation | 2 | 0: The fast feedback channel assigned to the AMS is kept1: The fast feedback channel is de-allocated at the frame specified by Start_Frame_Number2: The fast feedback channel is automatically de-allocated at the beginning of the Sleep Window whenever the fast feedback channel is newly assigned to the AMS during the Listening Window3: Reserved | |
| Start Frame Number | 6 | Least Significant 6 bits of Frame Number0~63Start frame number for sleep window. This represents the 6 least significant bits of frame number in which AMS enters the first sleep state in Sleep Mode or AMS applies changed the sleep cycle setting during the sleep mode. | |
| if(Operation == 0b01 \|\| Operation == 0b10) { | | | |
| TIMF | 1 | Traffic Indication Message Flag0 : AAI-TRF-IND message is not sent for the AMS1 : AAI-TRF-IND message is sent to the AMS during every Listening Window0~1 | |
| LWEF | 1 | Listening Window Extension Flag0: The Listening window is of fixed duration1: the Listening window is extensible | |
| NSCF | 2 | Next sleep cycle indicator.0b00 = Reset to Initial Sleep Cycle0b01 = min (2 × previous sleep cycle, Final Sleep Cycle)0b10 = Reset to another Initial Sleep Cycle value0b11 = Reserved | |
| Initial Sleep Cycle | 4 | This indicates an assigned duration for the Initial Sleep Cycle during which an AMS keeps sleep state in Sleep Mode (measured in frames).Value: 0~15Initial Sleep Cycle = Value + 1 | |
| Final Sleep Cycle | 10 | This indicates assigned duration for the Final Sleep Cycle (measured in frames).Value: 0~1023Final Sleep Cycle = Value + 1 | |
| Listening Window | 6 | Assigned duration of AMS's default Listening Window (measured in frames). This Listening_Window may be extended as long as there is UL/DL data traffic between AMS and ABS when Listening Window Extension is enabled. Value: 0~63Listening Window = Value + 1 | |
| Listening subframe bitmap | 8 | The bitmap indicates the subframes in each frame where the AMS needs to remain awake. The size of the bitmap equals to the number of AAI subframes of a frame. Bit #0 is mapped to the first AAI subframe. Each bit in the bitmap indicates:0: AMS does not wake up at the specific | |

TABLE 3-continued

| Field | Size(bits) | Value/Description | Condition |
|---|---|---|---|
| | | AAI subframe1: AMS wakes up at the specific AAI subframe | |
| if(TIMF == 1) { SLPID | 10 | This is an identifier assigned by the ABS when TIMF is set to 1. This ID shall be unique within an ABS. The other AMS shall not be assigned the same ID while the AMS is still in sleep mode.0~1023 | |
| } if(NSCF == 0b10) { New Initial Sleep Cycle | 5 | When the current Sleep Cycle is reset, if this value is included, the current Sleep Cycle shall be reset to this value. Otherwise, the current Sleep Cycle may be reset to Initial Sleep Cycle or may be updated to min (2 × Previous Sleep Cycle, Final Sleep Cycle).Value: 0~31New Initial Sleep Cycle = Value + 1 | |
| } if(LWEF == 1) { T_AMS | 6 | This timer is for Listening Window Extension of AMS.0~31 | |
| } } | | // ENDIF (Operation == 0b01 \|\| Operation == 0b10) | |
| } else { REQ_duration | | // ENDIF (Operation != 0b00) // equivalent to if(Response Code == 0b10) Waiting value for the AAI-SLP-REQ mes-sage re-transmission, which is the Least Significant 8 bits of Frame Number. If REQ_duration is missing in AAI-SLP-RSP when Response_Code == 0b10, it shall be regarded as REQ_duration = 00~255 | Optional: This para-meter may be omitted when (Response Code == 0b10) |
| } } | | | |

Table 4 shows an AAI_TRF-IND-RSP message according to the second exemplary embodiment of the present invention. As shown, the AAI_TRF-IND-RSP message includes a Frame_Number field and a New Initial Sleep cycle field. The Frame_Number field indicates a time point at which a sleep cycle is started. The Frame_Number field may indicate the least significant 10 bits of a frame number in which the sleep cycle is started.

The New Initial Sleep Cycle field indicates a new initial sleep cycle to be used by an MS receiving a positive indicator. That is, the New Initial Sleep Cycle field indicates the length of a next sleep cycle.

TABLE 4

| Field | Size(bits) | Value/Description | Condition |
|---|---|---|---|
| AAI-TRF IND-RSP message_format( ) { | | | |
| Frame_Number | 10 | Time point at which sleep cycle starts (time point at which listening window starts)The least significant 10 bits of the frame number in which incoming sleep cycle will start.0~1023When the AMS receives positive traffic in-dication from the ABS, the AMS shall reset the Sleep Cycle based on the starting frame number and the size of Sleep Cycle in the AAI_TRF-IND-RSP. | |

TABLE 4-continued

| Field | Size(bits) | Value/Description | Condition |
|---|---|---|---|
| Sleep Cycle Length (new initial sleep cycle) | 10 | Sleep cycle to be used by AMS receiving positive traffic indication. The length of Sleep Cycle which contains the next scheduled Listening Window. If the AMS receives the positive traffic indication during the Listening Window, the (current) Sleep Cycle shall be set to this value at that time. Value: 0~1023 Sleep Cycle Length = Value + 1 | |
| } | | | |

Figure 8:
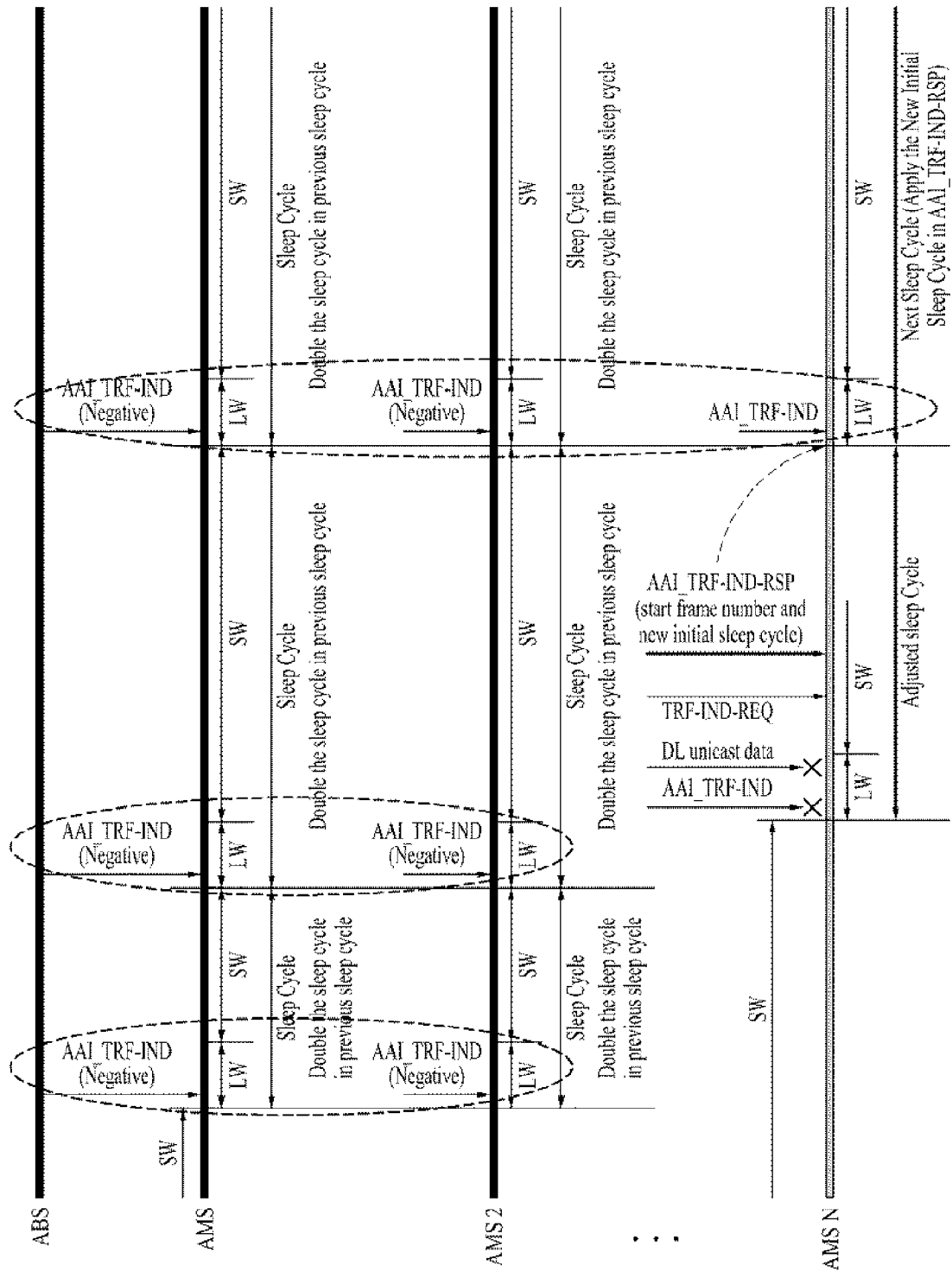
FIG. 8 is a diagram illustrating adjustment of synchronization of listening windows of sleep mode MSs using an AAI_TRF-IND-RSP message at a BS.

A BS may adjust synchronization of listening windows of sleep mode MSs using the AAI_TRF-IND-RSP message of a form shown in Table 4. FIG. 8 is a diagram illustrating adjustment of synchronization of listening windows of sleep mode MSs using an AAI_TRF-IND-RSP message at a BS.

As illustrated in FIG. 8, if an MS does not receive an AAI_TRF-IND message from the BS during a listening window, the MS transmits an Advanced Air Interface Traffic Indication Request (AAI_TRF-IND-REQ) message to the BS. The BS then transmits an Advanced Air Interface Traffic Indication Response (AAI_TRF-IND-RSP) message to the MS. The AAI_TRF-IND-RSP message includes a Frame_Number field and a New Initial Sleep Cycle field. The MS sets a sleep cycle to a length indicated by the New Initial Sleep Cycle field at a time point indicated by the Frame_Number field of the AAI_TRF-IND-RSP message.

Next, a data reception method of a sleep mode MS according to a third exemplary embodiment of the present invention will be described.

Figure 9:
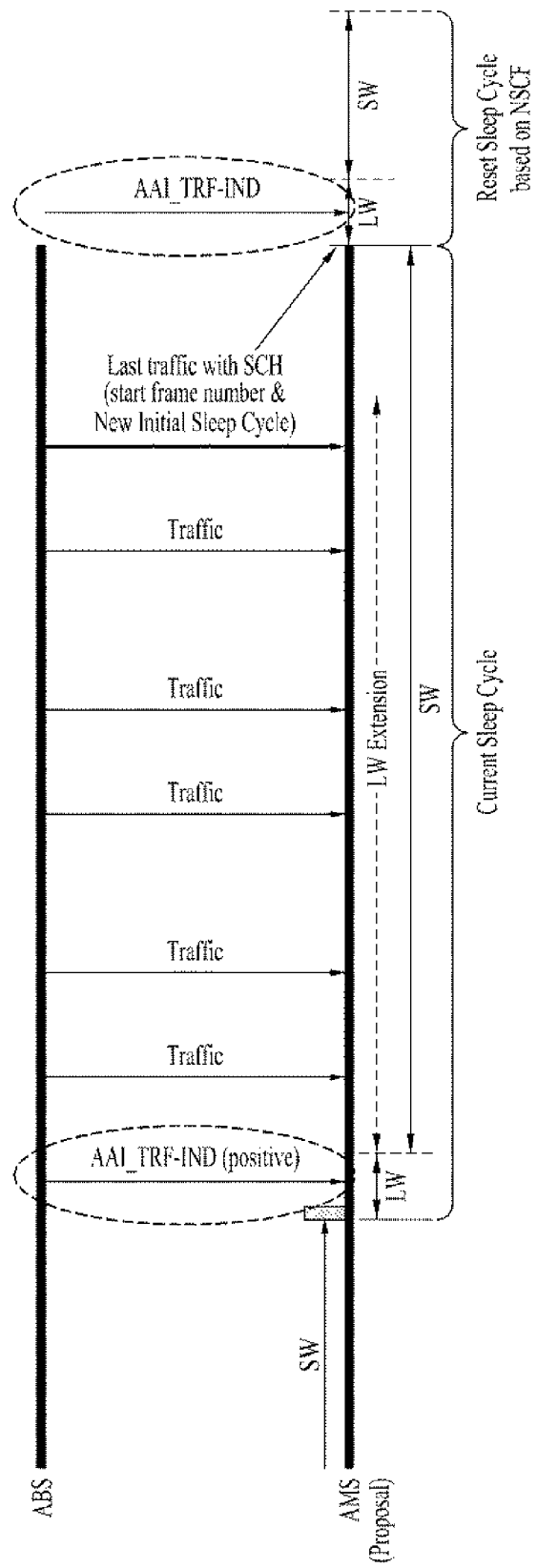
FIG. 9 is a diagram illustrating an example of a data reception method of a sleep mode MS according to a third exemplary embodiment of the present invention.

FIG. 9 is a diagram illustrating a data reception method of a sleep mode MS according to the third exemplary embodiment of the present invention.

As illustrated in FIG. 9, if there is traffic to be transmitted to or received from a BS even after a listening window, an MS extends the listening window to receive the traffic. The MS may extend the listening window without any restriction as to an extension range of the listening window. The BS transmits a Sleep Control Header (SCH) to the MS while transmitting the last traffic. The SCH includes a start frame number and a new initial sleep cycle. The start frame number indicates a start point of a next sleep cycle, and the new initial sleep cycle indicates the length of the next sleep cycle. Upon receiving the SCH, the MS sets a sleep cycle to an initial sleep cycle included in the SCH in a start frame number included in the SCH.

Figure 10:
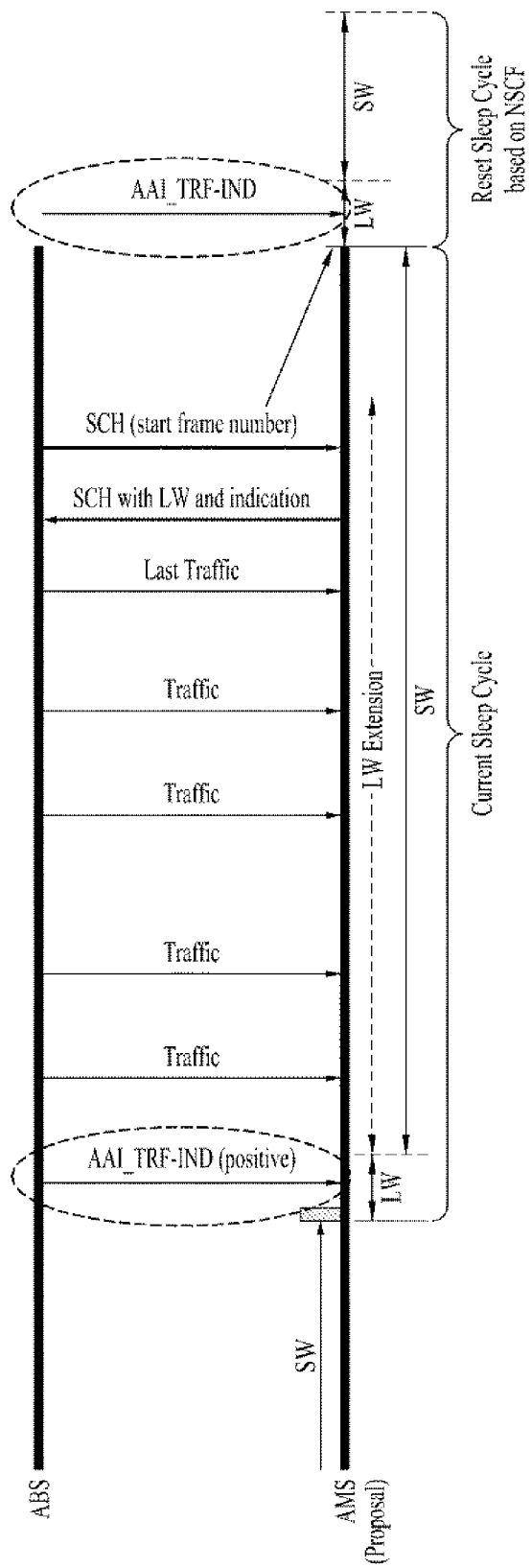
FIG. 10 is a diagram illustrating another example of a data reception method of a sleep mode MS according to the third exemplary embodiment of the present invention.

FIG. 10 is a diagram illustrating another example of a data reception method of a sleep mode MS according to the third exemplary embodiment of the present invention.

As illustrated in FIG. 10, if there is traffic to be transmitted to or received from a BS even after a listening window, an MS extends the listening window to receive the traffic. If the MS receives the last traffic from the BS, the MS transmits an SCH including a listening window end indication to the BS to inform the BS that traffic transmission/reception has been completed. Since the MS may have uplink traffic to be transmitted to the BS, the MS informs the BS that the listening window will be ended due to absence of the uplink traffic by transmitting the SCH including the listening window end indication. Upon receiving the SCH including the listening window end indication from the MS, the BS transmits an SCH including a start frame number of a next sleep cycle and a new initial sleep cycle to the MS, in order to adjust synchronization of listening windows of sleep mode MSs. Through such a process, synchronization of listening windows of sleep mode MSs is adjusted so that the number of AAI_TRF-IND messages transmitted to the sleep mode MSs by the BS can be reduced.

Table 5 shows an example of an SCH according to the third exemplary embodiment of the present invention. As shown in Table 5, the SCH according to the third exemplary embodiment of the present invention includes a Start Frame Number field and a New Initial Sleep Cycle field. The Start Frame Number field indicates a time point at which a next sleep cycle is started and the New Initial Sleep Cycle field indicates the length of the next sleep cycle.

TABLE 5

| Syntax | Size (bit) | Notes |
|---|---|---|
| Sleep Control Header Format ( ) { | | |
| FID | 4 | Flow Identifier. Set to 0010. |
| Type | 5 | MAC Signaling Header Type = 0b00011 |
| SCH sub-type | 3 | 0b000 =Listening Window control 0b001= Resume Sleep Cycle Indication 0b010=Multi-Carrier Listening Window control 0b011~0b111 = reserved |

TABLE 5-continued

| Syntax | Size (bit) | Notes |
| --- | --- | --- |
| Response Indication | 1 | 0: This indicates the request 1: This indicates the response (i.e., acknowledgment) to the request |
| if (SCH sub-type == Listening Window Control) { | — | — |
| Start Frame number | 6 | Least Significant 6 bits of Frame Number0~63Time point at which next sleep cycle will start (time point at which current sleep cycle ends). |
| New Initial Sleep Cycle | 5 | The next Sleep Cycle shall be reset to this value to synchronize the Listening Window of AMSs in sleep mode.Value: 0~31New Initial Sleep Cycle = Value + 1 |
| Listening Window End or Extension | 1 | 0=Listening Window End Indication1=Listening Window Extension Indication |
| if (Listening Window End or Extension ==1) { | — | — |
| Last frame of Extended Listening Window | 7 | LSB of frame sequence.Indicate the frame that extended listening window is terminated; |
| } | — | — |
| } else if (SCH sub-type == Resume Sleep Cycle Indication) { | — | — |
| Scheduled Sleep Cycle Interruption included | 1 | 0=no scheduled Sleep Cycle interruption is included with the Resume Sleep Cycle Indication1=scheduled Sleep Cycle interruption is included with the Resume Sleep Cycle Indication |
| if (Scheduled Sleep Cycle Interruption-included == 1) { | — | — |
| Start Frame Offset for Scheduled Sleep Cycle Interruption | 7 | Number of frames in the future from the frame containing this SCH at which the scheduled Sleep Cycle interruption will occur. Frame offset is value of this field plus one (i.e., range is 1 to 128). |
| } | — | — |
| } | — | — |
| else if (SCH sub-type == Multi-Carrier Listening Window control) { | | |
| Num Target Carrier | 4 | |
| for(i=0; i< Num_Target Carrier; i++) { | | |
| Target Carrier Index | 6 | Indicates that DL data transmission on the secondary carrier of physical carrier index ends. |
| } | | |
| } | | |
| Padding | variable | For byte alignment |
| } | — | — |

Table 6 shows another example of an SCH according to the third exemplary embodiment of the present invention. Table 6 shows the case of newly defining SCH sub-type called listening window synchronization. That is, an SCH includes an SCH sub-type field and fields determined according to a value of the SCH sub-type field. However, since the SCH sub-type of listening window synchronization is newly defined, if the SCH is listening window synchronization, the SCH includes a Start Frame Number field and a New Initial Sleep Cycle field.

TABLE 6

| Syntax | Size (bit) | Notes |
|---|---|---|
| Sleep Control Header Format ( ) { | | |
| FID | 4 | Flow Identifier. Set to 0010. |
| Type | 5 | MAC Signaling Header Type = 0b00011 |
| SCH sub-type | 3 | 0b000 =Listening Window control 0b001= Resume Sleep Cycle Indication 0b010=Multi-Carrier Listening Window control 0b011= Listening Window Synchronization 0b100~0b111 = reserved |
| Response Indication | 1 | 0: This indicates the request 1: This indicates the response (i.e., acknowledgment) to the request |
| if (SCH sub-type == Listening Window Control) { | — | — |
| Start Frame Number | 6 | Least Significant 6 bits of Frame Number 0~63 |
| Listening Window End or Extension | 1 | 0=Listening Window End Indication 1=Listening Window Extension Indication |
| if (Listening Window End or Extension ==1) { | — | — |
| Last frame of Extended Listening Window | 7 | LSB of frame sequence. Indicate the frame that extended listening window is terminated; |
| } | — | — |
| } else if (SCH sub-type == Resume Sleep Cycle Indication) { | — | — |
| Scheduled Sleep Cycle Interruption included | 1 | 0=No scheduled Sleep Cycle interruption is included with the Resume Sleep Cycle Indication 1=Scheduled Sleep Cycle interruption is included with the Resume Sleep Cycle Indication |
| if (Scheduled Sleep Cycle Interruption included == 1) { | — | — |
| Start Frame Offset for Scheduled Sleep Cycle Interruption | 7 | Number of frames in the future from the frame containing this SCH at which the scheduled Sleep Cycle interruption will occur. Frame offset is value of this field plus one (i.e., range is 1 to 128). |
| } | — | — |
| } | — | — |
| else if (SCH sub-type == Multi-Carrier Listening Window control) { | | |
| Num_Target Carrier | 4 | |
| for(i=0; i< Num Target Carrier; i++) { | | |
| Target Carrier Index | 6 | Indicates that DL data transmission on the secondary carrier of physical carrier index ends. |
| } | | |
| else if (SCH sub-type == Listening Window Synchronization) { | | |
| Start Frame Number | 6 | Least Significant 6 bits of Frame Number 0~63 Start frame number for next sleep cycle |
| New Initial Sleep Cycle | 5 | The next Sleep Cycle shall be reset to this value to synchronize the Listening Window of AMSs in sleep mode. Value: 0~31 New Initial Sleep Cycle = Value + 1 |
| } | | |
| } | | |
| Padding | variable | For byte alignment |
| } | — | — |

Next, a data reception method of a sleep mode MS according to a fourth exemplary embodiment of the present invention will be described.

Figure 11:
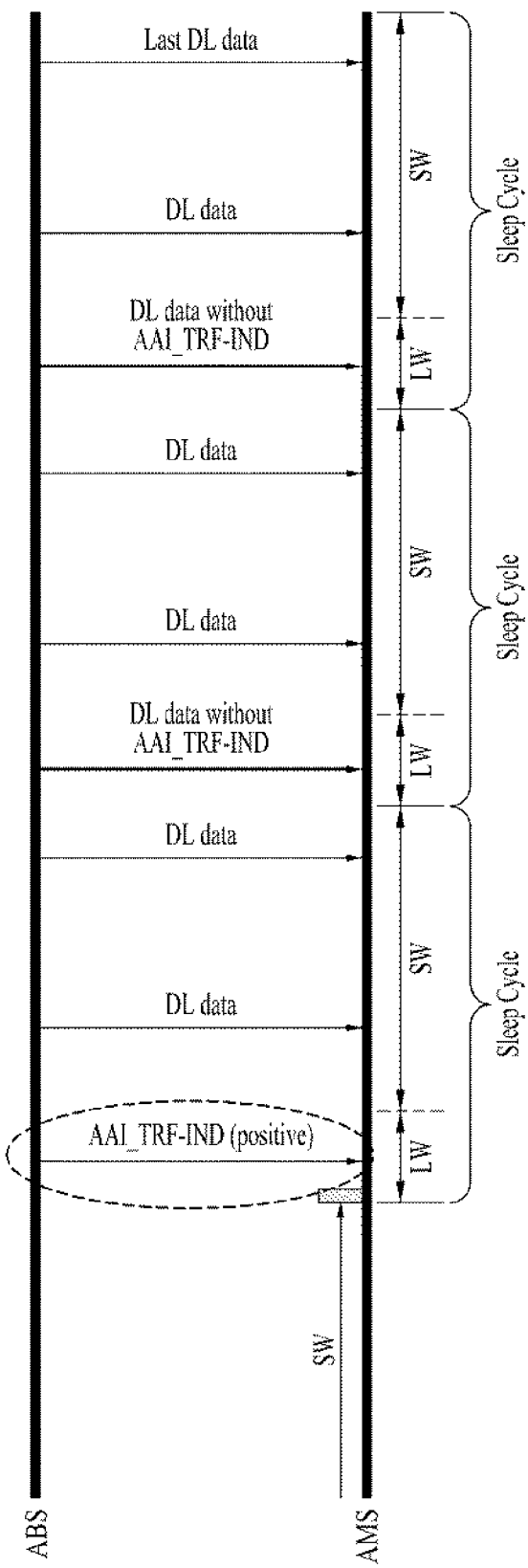
FIG. 11 is a diagram illustrating an example of a data reception method of a sleep mode MS according to a fourth exemplary embodiment of the present invention.

FIG. 11 is a diagram illustrating an example of a data reception method of a sleep mode MS according to the fourth exemplary embodiment of the present invention.

In the prior art, if a traffic indication message flag is set to 1 when an MS enters sleep mode, a BS should always transmits an AAI_TRF-IND message during a listening window. Accordingly, although the MS extends the listening window to receive traffic, the MS should receive the AAI_TRF-IND message every listening window. In a method proposed in the fourth exemplary embodiment of the present invention, in the case where the BS should continuously transmit downlink traffic to the MS, the BS transmits only the downlink traffic without the AAI_TRF-IND message to the MS so as to reduce transmission overhead of the AAI_TRF-IND message.

As illustrated in FIG. 11, if there is traffic to be transmitted by the BS to the MS after a listening window, the MS extends the listening window to receive downlink data. During a listening window of a next sleep cycle, the BS transmits only downlink data to the MS without transmitting the AAI_TRF-IND message. In some cases, the MS may not receive the AAI_TRF-IND message transmitted by the BS. Accordingly, if the MS receives only the downlink data without receiving the AAI_TRF-IND message during the listening window, the MS operates as if it had received the AAI_TRF-IND message including a positive indicator. Therefore, as in the fourth exemplary embodiment of the present invention, even if the BS does not transmit the AAI_TRF-IND message, the MS can normally perform a sleep mode operation.

Figure 12:
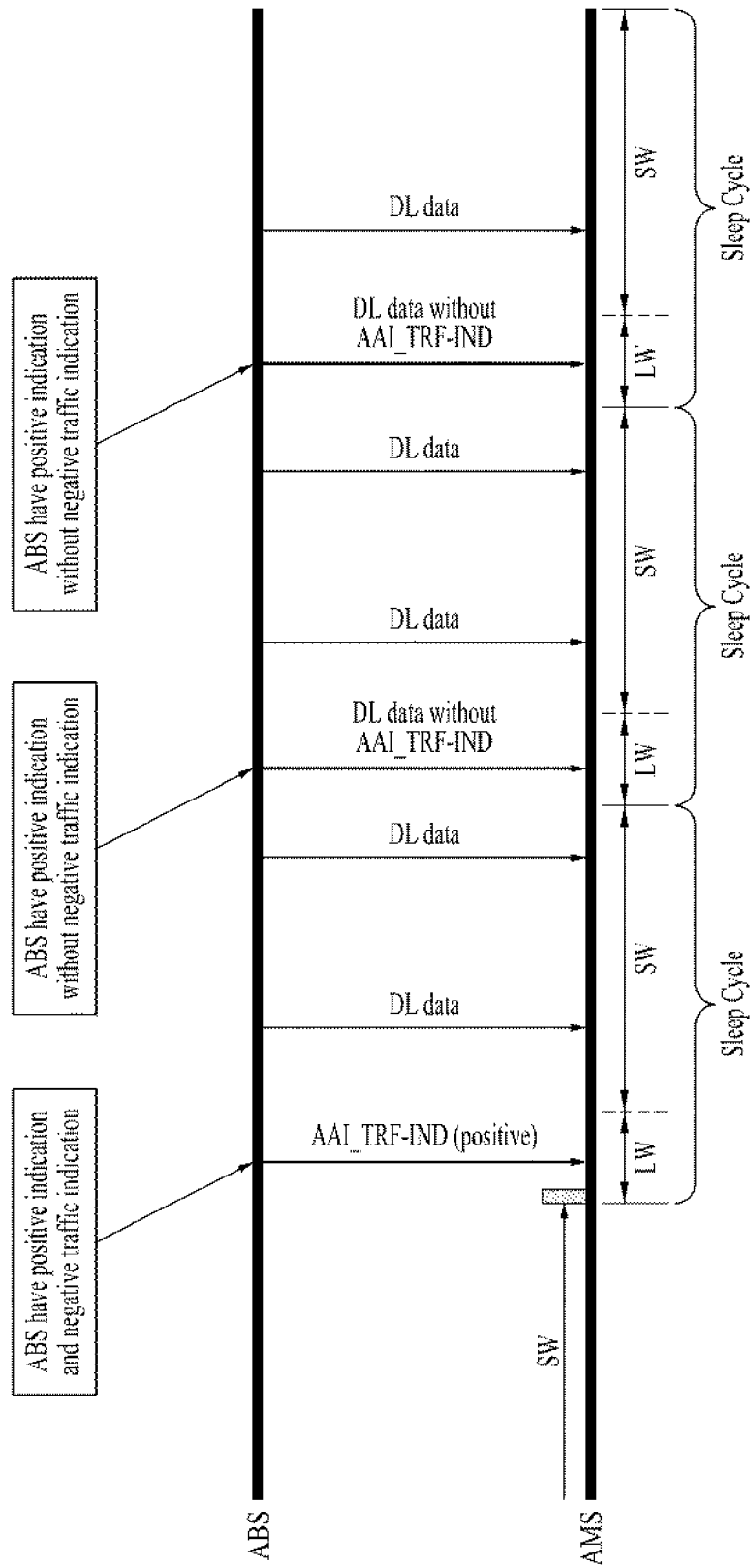
FIG. 12 is a diagram illustrating another example of a data reception method of a sleep mode MS according to the fourth exemplary embodiment of the present invention.

FIG. 12 is a diagram illustrating another example of a data reception method of a sleep mode MS according to the fourth exemplary embodiment of the present invention.

In FIG. 12, if traffic indication types of all sleep mode MSs having overlapped listening windows are positive indicators, a BS does not transmit an AAI_TRF-IND message.

According to the prior art, if 10 sleep mode MSs are present and listening windows of the 10 sleep mode MSs are all overlapped, the BS always transmits the AAI_TRF-IND message during a listening window of a sleep mode MS. However, in the fourth exemplary embodiment of the present invention, the BS may determine whether to transmit the AAI_TRF-IND message or transmit only downlink data according to a traffic indication type of MSs which are to receive the AAI_TRF-IND message during a corresponding listening window. Namely, if traffic indication types of all 10 sleep mode MSs are positive indicators, the BS does not transmit the AAI_TRF-IND message during a listening window and transmits only the downlink data to the MS. If at least one of the 10 sleep mode MSs has a negative indication, the BS should transmit the AAI_TRF-IND message to the MS.

Figure 13:
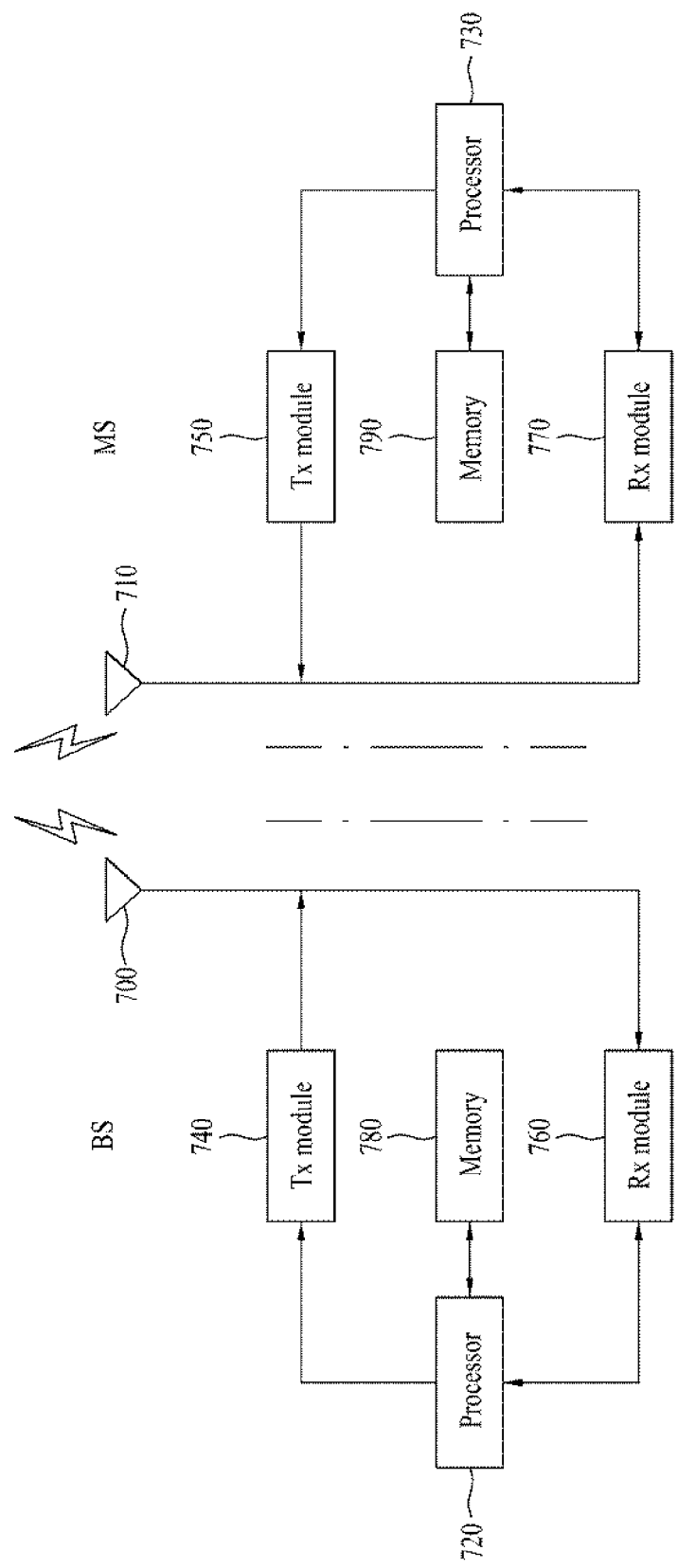
FIG. 13 is a diagram illustrating the configuration of an MS and a BS through which the exemplary embodiments of the present invention can be implemented.

FIG. 13 is a diagram illustrating the configuration of an MS and a BS through which the above-described embodiments of the present invention can be implemented.

An MS and a BS include antennas 700 and 710 for transmitting/receiving information, data, signals, and/or messages, transmission (Tx) modules 740 and 750 for transmitting messages by controlling the antennas 700 and 710, reception (Rx) modules 760 and 770 for receiving messages by controlling the antennas 700 and 710, memories 780 and 790 for storing information associated with communication with the BS, and processors 720 and 730 for controlling the Tx modules 740 and 750, the Rx modules 760 and 770, and the memories 780 and 790. The BS may be a femto BS or a macro BS.

The antennas 700 and 710 transmit signals generated from the Tx modules 740 and 750 to the outside, or transfer radio signals received from the outside to the Rx modules 760 and 770. If a Multiple Input Multiple Output (MIMO) function is supported, each of the antennas 700 and 710 may include two or more antennas.

The processors 720 and 730 typically control overall operation of the MS and the BS. Especially, the processors 720 and 730 may carry out a control function for performing the embodiments of the present invention, a Medium Access Control (MAC) frame variable control function based on service characteristics and propagation environments, a handover function, an authentication and encryption function, and the like.

The processors 720 and 730 may include encryption modules for controlling encryption of various messages and timer modules for controlling transmission/reception of various messages.

The Tx modules 740 and 750 perform predetermined coding and modulation for signals and/or data, which are scheduled from the processors 720 and 730 and transmitted to the outside, and then transfer the modulated signals and/or data to the antennas 700 and 710.

The Rx modules 760 and 770 perform decoding and demodulation of signals received through the antennas 700 and 710 from the outside, restore the signals into original data, and transfer the restored data to the processors 720 and 730.

The memories 780 and 790 may store programs required for signal processing and control of the processors 720 and 730 and temporarily store input and output data (in case of the MS, uplink grant allocated from the BS, system information, a Station Identifier (STID), a Flow Identifier (FID), action time, region allocation information, frame offset information, etc.).

Each of the memories 780 and 790 may include at least one storage medium among a flash memory-type storage medium, a hard disk-type storage medium, a multimedia card micro-type storage medium, a card-type memory (e.g. a Secure Digital (SD) or eXtreme Digital (XS) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disk.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. For example, those skilled in the art may use each construction described in the above embodiments in combination with each other.

Accordingly, the invention should not be limited to the specific embodiments described herein, but should be accorded the broadest scope consistent with the principles and novel features disclosed herein.

Industrial Applicability

Apparatus and method of receiving data according to various embodiments of present invention is industrially applied to mobile communication system such as 3GPP LTE, LTE-A, IEEE 802.

The invention claimed is:

1. A method of performing a sleep cycle operation at a mobile station in a wireless communication system, the method comprising:

receiving an Advanced Air Interface Traffic Indication (AAI-TRF-IND) message for a traffic indication during a listening window of a first sleep cycle;

resetting a length of the first sleep cycle based on a next sleep cycle flag (NSCF) included in an Advanced Air Interface Sleep Response (AAI-SLP-RSP) message when then AAI-TRF-IND message includes a positive indicator, receiving first traffic during the listening widow of the first sleep cycle;

extending the listening widow of the first sleep cycle, when second traffic is transmitted by a base station after the listening window of the first sleep cycle; and receiving the second traffic and a sleep control header during the extended listening window of the first sleep cycle, wherein the listening window of the first sleep cycle is extended without restriction to the first sleep cycle, and wherein the sleep control header contains a start frame number and a new initial sleep cycle, the start frame number indicates a start point of a second sleep cycle following the first sleep cycle and the second sleep cycle is reset to the new initial sleep cycle to be synchronized with listening windows of other mobile stations in a sleep mode.

2. The method of claim 1, further comprising:
receiving an unsolicited Advanced Air Interface Sleep Response (unsolicited AAI-SLP-RSP) message including the NSCF and an indicator that indicates a change of a first sleep cycle setting.

3. The method of claim 1, wherein the NSCF is determined by a negotiation with the base station through an Advanced Air Interface Sleep Request (AAI-SLP-REQ) message and the AAI-SLP-RSP message.

4. The method of claim 1, wherein the length of the first sleep cycle is reset to a length of an initial sleep cycle if a value of the NSCF is set to 0b00.

5. The method of claim 1, wherein the length of the first sleep cycle is reset to a length of a new sleep cycle if a value of the NSCF is set to 0b10.

6. The method of claim 1, wherein the AAI-TRF-IND message including information regarding a number of mobile stations that receives the positive indicator.

7. A method of performing a sleep cycle operation at a base station in a wireless communication system, the method comprising:
transmitting an Advanced Air Interface Traffic Indication (AAI-TRF-IND) message for a traffic indication during a listening window of a first sleep cycle;
transmitting first traffic during the listening widow of the first sleep cycle;
transmitting second traffic and a sleep control header,
wherein the base station includes a positive indicator in the AAI-TRF-IND message such that a length of the first sleep cycle is reset by a mobile station based on a next sleep cycle flag (NSCF) included in an Advanced Air Interface Sleep Response (AAI-SLP-RSP) message,
wherein when the second traffic is transmitted by the base station after the listening window of the first sleep cycle, the listening widow of the first sleep cycle is extended without restriction to the first sleep cycle, and
wherein the sleep control header contains a start frame number and a new initial sleep cycle, the start frame number indicates a start point of a second sleep cycle following the first sleep cycle and the second sleep cycle is reset to the new initial sleep cycle to be synchronized with listening windows of other mobile stations in a sleep mode .

8. The method of claim 7, further comprising:
transmitting an unsolicited Advanced Air Interface Sleep Response (unsolicited AAI-SLP-RSP) message including the NSCF and an indicator that indicates a change of a first sleep cycle setting.

9. The method of claim 7, wherein the NSCF is determined by a negotiation with the mobile station through an Advanced Air Interface Sleep Request (AAI-SLP-REQ) message and the AAI-SLP-RSP message.

10. The method of claim 7, wherein the length of the first sleep cycle is reset to a length of an initial sleep cycle if a value of the NSCF is set to 0b00.

11. The method of claim 7, wherein the length of the first sleep cycle is reset to a length of a new sleep cycle if a value of the NSCF is set to 0b10.

12. A mobile station of performing a sleep cycle operation in a wireless communication system, the mobile station comprising:
a receiving module to receive an Advanced Air Interface Traffic Indication (AAI-RF-IND) message for a traffic indication during a listening window of a first sleep cycle and to receive first traffic during the listening widow of the first sleep cycle; and
a processor to reset a length of the first sleep cycle based on a next sleep cycle flag (NSCF) included in an Advanced Air Interface Sleep Response (AAI-SLP-RSP) message when the AAI-TRF-IND message includes a positive indicator,
wherein the processor extends the listening widow of the first sleep cycle without restriction to the first sleep cycle, when second traffic is transmitted by a base station after the listening window of the first sleep cycle,
wherein the receiving module receives the second traffic and a sleep control header during the extended listening window of the first sleep cycle, and
wherein the sleep control header contains a start frame number and a new initial sleep cycle, the start frame number indicates a start point of a second sleep cycle following the first sleep cycle and the second sleep cycle is reset to the new initial sleep cycle to be synchronized with listening windows of other mobile stations in a sleep mode.

13. A base station of performing a sleep cycle operation in a wireless communication system, the base station comprising:
a transmitting module to transmit an Advanced Air Interface Traffic Indication (AAI-TRF-IND) message for a traffic indication during a listening window of a first sleep cycle, to transmit first traffic during the listening widow of the first sleep cycle and to transmit second traffic and a sleep control header; and
a processor to include a positive indicator in the AAI-TRF-IND message such that a length of the first sleep cycle is reset by a mobile station based on a next sleep cycle flag (NSCF) included in an Advanced Air Interface Sleep Response (AAI-SLP-RSP) message,
wherein the listening widow of the first sleep cycle is extended without restriction to the first sleep cycle, when the second traffic is transmitted by the base station after the listening window of the first sleep cycle, and
wherein the sleep control header contains a start frame number and a new initial sleep cycle, the start frame number indicates a start point of a second sleep cycle following the first sleep cycle and the second sleep cycle is reset to the new initial sleep cycle to be synchronized with listening windows of other mobile stations in a sleep mode.

* * * * *